United States Patent
Nagasawa et al.

(10) Patent No.: US 11,380,935 B2
(45) Date of Patent: Jul. 5, 2022

(54) RESIN COMPOSITION FOR NONAQUEOUS ELECTROLYTE SECONDARY BATTERY, SEPARATOR FOR NONAQUEOUS ELECTROLYTE SECONDARY BATTERY USING SAME, RESIN COMPOSITION FOR ELECTRODE MIXTURE LAYER, ELECTRODE FOR NONAQUEOUS ELECTROLYTE SECONDARY BATTERY, AND NONAQUEOUS ELECTROLYTE SECONDARY BATTERY

(71) Applicant: Kureha Corporation, Tokyo (JP)

(72) Inventors: Yoshiyuki Nagasawa, Tokyo (JP); Aya Shike, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 17/059,108

(22) PCT Filed: Feb. 21, 2019

(86) PCT No.: PCT/JP2019/006559
§ 371 (c)(1),
(2) Date: Nov. 25, 2020

(87) PCT Pub. No.: WO2019/230075
PCT Pub. Date: Dec. 5, 2019

(65) Prior Publication Data
US 2021/0210783 A1 Jul. 8, 2021

(30) Foreign Application Priority Data

May 31, 2018 (JP) .............................. JP2018-104687

(51) Int. Cl.
| | |
|---|---|
| H01M 10/0565 | (2010.01) |
| H01M 50/449 | (2021.01) |
| C08K 5/02 | (2006.01) |
| C08L 27/16 | (2006.01) |
| C08L 27/20 | (2006.01) |
| H01M 10/0525 | (2010.01) |
| C08F 214/22 | (2006.01) |
| C08F 214/28 | (2006.01) |
| H01M 50/426 | (2021.01) |
| H01M 4/04 | (2006.01) |
| H01M 4/62 | (2006.01) |

(52) U.S. Cl.
CPC ....... *H01M 10/0565* (2013.01); *C08F 214/22* (2013.01); *C08F 214/28* (2013.01); *C08K 5/02* (2013.01); *C08L 27/16* (2013.01); *C08L 27/20* (2013.01); *H01M 4/0404* (2013.01); *H01M 4/623* (2013.01); *H01M 10/0525* (2013.01); *H01M 50/426* (2021.01); *H01M 50/449* (2021.01); *H01M 2300/0082* (2013.01); *H01M 2300/0085* (2013.01)

(58) Field of Classification Search
CPC .......... H01M 10/0565; H01M 50/449; H01M 4/0404; H01M 4/623; H01M 10/0525; H01M 2300/0092; H01M 2300/0085
See application file for complete search history.

(56) References Cited

U.S. PATENT DOCUMENTS

| | | | |
|---|---|---|---|
| 6,265,107 B1 | 7/2001 | Shimizu et al. | |
| 6,586,547 B1 * | 7/2003 | Amin-Sanayei | ...... C08F 214/22 526/250 |
| 6,630,271 B1 | 10/2003 | Arcella et al. | |
| 10,074,841 B2 * | 9/2018 | Takeuchi | .............. H01M 4/139 |
| 2003/0054884 A1 | 3/2003 | Stern | |
| 2010/0028768 A1 * | 2/2010 | Morita | .................. H01M 4/362 429/144 |
| 2014/0342224 A1 | 11/2014 | Cojocaru et al. | |
| 2015/0050555 A1 | 2/2015 | Fukumine et al. | |

(Continued)

FOREIGN PATENT DOCUMENTS

| | | | |
|---|---|---|---|
| CN | 1240053 A | 12/1999 | |
| CN | 1327455 | * 12/2001 | ............ C08F 214/18 |

(Continued)

OTHER PUBLICATIONS

Korean Office Action for Application No. 10-2020-7035279, dated Feb. 19, 2021.
Chinese Office Action and Search Report for Chinese Application No. 201980029925.X, dated Apr. 2, 2021, with English translation of the Office Action.
Cznotka et al., "Characterization of semi-interpenetrating polymer electrolytes containing poly(vinylidene fluoride-co-hexafluoropropylene) and ether-modified polysiloxane," Solid State Ionics, vol. 289, 2016 (published online Mar. 10, 2016), pp. 35-47.
Extended European Search Report for European Application No. 19809995.4, dated Jun. 10, 2021.

(Continued)

*Primary Examiner* — Jonathan Crepeau
*Assistant Examiner* — Angela J Martin
(74) *Attorney, Agent, or Firm* — Birch, Stewart, Kolasch & Birch, LLP

(57) ABSTRACT

A resin composition for a non-aqueous electrolyte secondary battery that includes a vinylidene fluoride copolymer having a constituent unit derived from vinylidene fluoride and a constituent unit derived from a fluorine-containing alkyl vinyl compound. A melting point, measured in accordance with ASTM D3418, of the vinylidene fluoride copolymer is from 105° C. to 125° C., and a mass fraction $W_a$ of the constituent unit derived from the fluorine-containing alkyl vinyl compound in the vinylidene fluoride copolymer, a degree of crystallinity $D_C$ of the vinylidene fluoride copolymer, and a degree of amorphicity $D_A$ of the vinylidene fluoride copolymer satisfy Equation (1) below:

$$4.7 \leq W_a \times (D_C/D_A) \leq 14 \qquad (1).$$

9 Claims, No Drawings

(56) References Cited

U.S. PATENT DOCUMENTS

| | | |
|---|---|---|
| 2015/0340676 A1 | 11/2015 | Schmidhauser et al. |
| 2016/0079582 A1* | 3/2016 | Takeuchi ............ H01M 10/05 429/144 |
| 2016/0266599 A1 | 9/2016 | Damen et al. |
| 2016/0268599 A1* | 9/2016 | Damen ................ H01M 4/139 |
| 2017/0288189 A1 | 10/2017 | Inaba et al. |
| 2019/0348711 A1 | 11/2019 | Watanabe |

FOREIGN PATENT DOCUMENTS

| | | | |
|---|---|---|---|
| CN | 1327455 A | 12/2001 | |
| CN | 103931026 A | 7/2014 | |
| CN | 104137311 A | 11/2014 | |
| CN | 104396060 A | 3/2015 | |
| CN | 105723547 * | 6/2016 | .......... H01M 4/1397 |
| CN | 105723547 A | 6/2016 | |
| CN | 105723547 A * | 6/2016 | .......... H01M 10/052 |
| EP | 1028479 A2 | 8/2000 | |
| JP | 7-18002 A | 1/1995 | |
| JP | 2000-150320 A | 5/2000 | |
| JP | 2000-231936 A | 8/2000 | |
| JP | 2003-514036 T | 4/2003 | |
| JP | 2012-067324 A | 4/2012 | |
| JP | 2013-122009 A | 6/2013 | |
| JP | 2015-533453 A | 11/2015 | |
| JP | 2017-165881 A | 9/2017 | |
| KR | 10-2017-0045312 A | 4/2017 | |
| KR | 2017-0045312 A | 4/2017 | |
| WO | 2001032726 A1 | 5/2001 | |
| WO | 2014071144 A1 | 5/2014 | |
| WO | 2017/047576 A1 | 3/2017 | |

OTHER PUBLICATIONS

Kim, "Hybrid gel polymer electrolyte for high-safety lithium-sulfur batteries," Materials Letters, vol. 187, 2017 (published online Oct. 17, 2016), pp. 40-43.

Chinese Office Action and Search Report for Chinese Application No. 201980029925.X dated Sep. 24, 2021, with an English translation.

* cited by examiner

US 11,380,935 B2

RESIN COMPOSITION FOR NONAQUEOUS ELECTROLYTE SECONDARY BATTERY, SEPARATOR FOR NONAQUEOUS ELECTROLYTE SECONDARY BATTERY USING SAME, RESIN COMPOSITION FOR ELECTRODE MIXTURE LAYER, ELECTRODE FOR NONAQUEOUS ELECTROLYTE SECONDARY BATTERY, AND NONAQUEOUS ELECTROLYTE SECONDARY BATTERY

TECHNICAL FIELD

The present invention relates to a resin composition for a non-aqueous electrolyte secondary battery, a separator for a non-aqueous electrolyte secondary battery using the same, a resin composition for an electrode mixture layer, an electrode for a non-aqueous electrolyte secondary battery, and a non-aqueous electrolyte secondary battery.

BACKGROUND ART

The non-aqueous electrolyte secondary battery, such as a lithium-ion secondary battery, has a high voltage and a high energy density and therefore has been used for various applications, for example, as a power source for mobile electronic devices, such as smartphones, or for electric vehicles.

An electrode for a typical non-aqueous electrolyte secondary battery has a current collector and an electrode mixture layer disposed on the current collector. The electrode mixture layer typically contains an electrode active material and a binder for adhering the electrode active material to the current collector. Furthermore, in the related art, a vinylidene fluoride copolymer obtained by copolymerizing a vinylidene fluoride homopolymer (polyvinylidene fluoride) or vinylidene fluoride and other monomers are applied to such a binder. In addition, these are also applied to a resin layer or the like constituting a separator for a non-aqueous electrolyte secondary battery.

Here, it has been known that a vinylidene fluoride copolymer obtained by copolymerizing vinylidene fluoride and a fluorine-containing alkyl vinyl compound has a higher adhesive strength, compared with vinylidene fluoride homopolymer, with respect to constituent materials for the non-aqueous electrolyte secondary battery (for example, a current collector, a separator film, an electrode active material, and the like). Therefore, various vinylidene fluoride copolymers obtained by copolymerizing vinylidene fluoride and a fluorine-containing alkyl vinyl compound have been proposed (Patent Documents 1 to 3).

For example, Patent Document 1 discloses a vinylidene fluoride copolymer having a continuously changed structure by continuously changing reaction conditions during polymerization of vinylidene fluoride and a fluorine-containing alkyl vinyl compound. On the other hand, Patent Documents 2 and 3 disclose a vinylidene fluoride copolymer having a reduced crystallinity by increasing mass fraction of constituent units derived from the fluorine-containing alkyl vinyl compound in the vinylidene fluoride copolymer.

CITATION LIST

Patent Document

Patent Document 1: JP 7-18002 A
Patent Document 2: JP 2012-67324 A
Patent Document 3: JP 2003-514036 T

SUMMARY OF INVENTION

Technical Problem

When the mass fraction of constituent units derived from the fluorine-containing alkyl vinyl compound in the vinylidene fluoride copolymer is increased, the adhesive strength of the vinylidene fluoride copolymer to the current collector, separator film, active material, and the like increases. On the other hand, the vinylidene fluoride copolymer tends to swell by an electrolytic solution of the non-aqueous electrolyte secondary battery or dissolve in the electrolytic solution. Furthermore, when forming a layer containing a vinylidene fluoride copolymer, it is common to dissolve and the vinylidene fluoride copolymer in N-methylpyrrolidone and form a film. However, as the amount of constituent units derived from the fluorine-containing alkyl vinyl compound increases, the solubility with respect to N-methylpyrrolidone becomes low, and film formation becomes deteriorated.

The present invention has been made in view of the above circumstances. In other words, an object of the present invention is to provide a resin composition for a non-aqueous electrolyte secondary battery, the resin composition including a vinylidene fluoride copolymer which has: a high adhesive strength with respect to a constituent material of the non-aqueous electrolyte secondary battery, small swelling caused by an electrolytic solution, and high solubility with respect to N-methylpyrrolidone.

Solution to Problem

According to the present invention, a resin composition for a non-aqueous electrolyte secondary battery contains: a vinylidene fluoride copolymer having a constituent unit derived from vinylidene fluoride and a constituent unit derived from a fluorine-containing alkyl vinyl compound, in which a melting point, measured in accordance with ASTM D3418, of the vinylidene fluoride copolymer is from 105° C. to 125° C., and a mass fraction $W_a$ of the constituent unit derived from the fluorine-containing alkyl vinyl compound in the vinylidene fluoride copolymer, a degree of crystallinity $D_C$ of the vinylidene fluoride copolymer, and a degree of amorphicity $D_A$ of the vinylidene fluoride copolymer satisfy Equation (1) below:

$$4.7 \leq W_a \times (D_C/D_A) \leq 14 \tag{1}$$

According to the present invention, a separator for a non-aqueous electrolyte secondary battery includes: a separator film; and a resin layer disposed on at least one surface of the separator film, in which the resin layer contains at least a solid content of the resin composition for a non-aqueous electrolyte secondary battery.

According to the present invention, a resin composition for an electrode mixture layer includes: the resin composition for a non-aqueous electrolyte secondary battery described above; and an electrode active material.

According to the present invention, an electrode for a non-aqueous electrolyte secondary battery includes: a current collector; and an electrode mixture layer disposed on the current collector, in which the electrode mixture layer contains a solid content of the resin composition for an electrode mixture layer.

According to the present invention, a non-aqueous electrolyte secondary battery includes: a pair of electrodes; and a separator disposed therebetween, in which the separator is the separator for a non-aqueous electrolyte secondary battery.

According to another aspect of the present invention, a non-aqueous electrolyte secondary battery includes at least a pair of electrodes, in which at least one of the pair of electrodes is the electrode for a non-aqueous electrolyte secondary battery.

Advantageous Effects of Invention

According to the present invention, it is possible to use a resin composition for a non-aqueous electrolyte secondary battery, the resin composition including a vinylidene fluoride copolymer which has: a high adhesive strength with respect to a constituent material of the non-aqueous electrolyte secondary battery, small swelling caused by an electrolytic solution, and high solubility with respect to N-methylpyrrolidone.

DESCRIPTION OF EMBODIMENTS

As disclosed in Patent Documents 1 to 3 described above, by simply increasing the mass fraction of the constituent unit derived from the fluorine-containing alkyl vinyl compound in the vinylidene fluoride copolymer, the solubility of the vinylidene fluoride copolymer with respect to N-methylpyrrolidone is low. As a result, it becomes difficult to uniformly form a film using the vinylidene fluoride copolymer, and difficult to analyze the vinylidene fluoride copolymer. Furthermore, when the mass fraction of constituent units derived from the fluorine-containing alkyl vinyl compound is increased, problems occur such that the melting point of the vinylidene fluoride copolymer tends to decrease, the vinylidene fluoride copolymer tends to dissolve in the electrolytic solution, swelling easily occurs due to the electrolytic solution, or the film formation is deteriorated.

In this regard, that the present inventors have found that the above-mentioned problems are solved by a vinylidene fluoride copolymer in which a melting point is within a predetermined range and in which a mass fraction $W_a$ of a constituent unit derived from a fluorine-containing alkyl vinyl compound in the vinylidene fluoride copolymer, a degree of crystallinity $D_C$ of the vinylidene fluoride copolymer, and a degree of amorphicity $D_A$ of the vinylidene fluoride copolymer satisfy a specific relationship. In other words, the inventors of the present invention have discovered that the vinylidene fluoride copolymer can have: a high adhesive strength with respect to a constituent material of the non-aqueous electrolyte secondary battery, small swelling caused by an electrolytic solution, and high solubility with respect to N-methylpyrrolidone.

Specifically, when $W_a$, $D_C$, and $D_A$ described above satisfy $4.7 \leq W_a \times (D_C/D_A) \leq 14$, the balance between the amount of constituent units derived from the fluorine-containing alkyl vinyl compound and the crystallinity of the vinylidene fluoride copolymer is improved. As a result, even if the mass fraction $W_a$ of the constituent unit derived from the fluorine-containing alkyl vinyl compound is increased to a certain degree, the swelling caused by the electrolytic solution and the dissolution in the electrolytic solution are suppressed, and the solubility with respect to N-methylpyrrolidone is enhanced. Furthermore, at this time, by setting the melting point of the vinylidene fluoride copolymer from 105° C. to 125° C., the swelling of the vinylidene fluoride copolymer caused by the electrolytic solution is suppressed, and the solubility with respect to N-methylpyrrolidone is enhanced. In addition, when the melting point of the vinylidene fluoride copolymer is within the range described above, there is an advantage that uniformly forming a film is facilitated when forming a film by using the resin composition for a non-aqueous electrolyte secondary battery.

1. Resin Composition for Non-Aqueous Electrolyte Secondary Battery

The resin composition for a non-aqueous electrolyte secondary battery (hereinafter, also referred to as "resin composition for a secondary battery") of the present invention may contain at least the above vinylidene fluoride copolymer, may be formed of only the vinylidene fluoride copolymer, and may contain a water-soluble polymer, a filler, a solvent (dispersion medium), various additives, and the like, within a range that does not impair the object and effect of the present invention. In addition, the shape of the resin composition for a secondary battery may be a powder or liquid (for example, a colloidal shape or the like), or may be a bulk (such as a crumb shape) or the like.

The amount of the vinylidene fluoride copolymer contained in the resin composition for a secondary battery is appropriately selected according to the application of the resin composition for a secondary battery, but can be set to, for example, 10 mass % or greater with respect to the total amount of solid content of the resin composition for a secondary battery. When 10 mass % or greater of the vinylidene fluoride copolymer is contained in the solid content of the resin composition for a secondary battery, the strength of the layer obtained from the resin composition for a secondary battery tends to be sufficiently high, and the adhesive strength with respect to the constituent material of the non-aqueous electrolyte secondary battery tends to be sufficiently high. Note that, in the present specification, a component excluding a solvent or a dispersion medium from the resin composition for a secondary battery is referred to as "solid content of a resin composition for a secondary battery".

1-1. Vinylidene Fluoride Copolymer (1) Structure of Vinylidene Fluoride Copolymer The vinylidene fluoride copolymer has a constituent unit derived from vinylidene fluoride and a constituent unit derived from a fluorine-containing alkyl vinyl compound. The vinylidene fluoride copolymer may be a block copolymer, and is normally a random copolymer.

A mass fraction $W_v$ of a constituent unit derived from the vinylidene fluoride in the vinylidene fluoride copolymer is preferably 70 mass % or greater and 85 mass % or less, more preferably 70 mass % or greater and 82 mass % or less, and even more preferably 71 mass % or greater and 80 mass % or less. When the mass fraction $W_v$ of the constituent unit derived from vinylidene fluoride is 70 mass % or greater, the melting point of the vinylidene fluoride copolymer tends to fall within the range described above. Furthermore, when the amount $W_v$ of the constituent unit derived from vinylidene fluoride is 85 mass % or less, the mass fraction $W_a$ of the constituent unit derived from the fluorine-containing alkyl vinyl compound becomes sufficiently large, and the adhesion of the vinylidene fluoride copolymer to the various constituent materials (for example, a current collector, a separator film, an active material, and the like) of the non-aqueous electrolyte secondary battery. The mass fraction $W_v$ of the constituent unit derived from vinylidene fluoride can be specified by analyzing the vinylidene fluoride copolymer by $^{19}$F-NMR.

On the other hand, a mass fraction $W_a$ of a constituent unit derived to from a fluorine-containing alkyl vinyl compound in the vinylidene fluoride copolymer is preferably 15 mass % or greater and 30 mass % or less, more preferably 18 mass % or greater and 30 mass % or less, and even more preferably 20 mass % or greater and 29 mass % or less. When the mass fraction $W_a$ of the constituent unit derived from the fluorine-containing alkyl vinyl compound is 15 mass % or greater, the adhesion of the vinylidene fluoride copolymer to the various constituent materials of the non-aqueous electrolyte secondary battery tends to be enhanced. On the other hand, when the mass fraction $W_a$ of the constituent unit derived from the fluorine-containing alkyl vinyl compound is 30 mass % or less, the value represented by $W_a \times (D_C/D_A)$ tends to fall within the desired range. The mass fraction $W_a$ of the constituent unit derived from fluorine-containing alkyl vinyl compound can be specified by analyzing the vinylidene fluoride copolymer by $^{19}$F-NMR.

Note that, in the present specification, a compound referred to as "fluorine-containing alkyl vinyl compound" refers to a compound (here, vinylidene fluoride is excluded) in which at least one fluorine-containing alkyl group (n is an integer of 0 or greater, y is an integer of 1 or greater and (2n+1) or less) represented by $C_nH_{(2n+1-y)}F_y$ is bonded to a vinyl group.

Examples of the fluorine-containing alkyl vinyl compound include vinyl fluoride, trifluoroethylene, tetrafluoroethylene, chlorotrifluoroethylene, and hexafluoropropylene. Among them, hexafluoropropylene, tetrafluoroethylene, and chlorotrifluoroethylene are preferable, and hexafluoropropylene is particularly preferable. In the vinylidene fluoride copolymer, only one type of constituent unit derived from the fluorine-containing alkyl vinyl compound may be contained, or two or more types thereof may be contained.

The vinylidene fluoride copolymer may have constituent units (hereinafter, also referred to as "other constituent units") derived from compounds other than vinylidene fluoride and the fluorine-containing alkyl vinyl compound in a range that does not impair the object and effect of the present invention.

Examples of other constituent units include constituent units derived from a crosslinkable alkyl vinyl compound having a vinyl group and a crosslinkable group. The crosslinkable alkyl vinyl compound preferably contains a fluorine atom. Examples of the crosslinkable alkyl vinyl compound include perfluoro divinyl ether and perfluoroalkylene divinyl ether. Note that, examples of the perfluoroalkylene divinyl ether include a compound having a structure in which two vinyl ether groups, in which all hydrogen atoms are replaced with fluorine atoms, are bonded by a linear or branched divalent perfluoroalkylene group having from 1 to 6 carbons. When the vinylidene fluoride copolymer contains constituent units derived from the crosslinkable alkyl vinyl compound, the adhesion of the vinylidene fluoride copolymer to the various constituent materials of the non-aqueous electrolyte secondary battery is enhanced, and the vinylidene fluoride copolymer becomes less likely to swell due to the electrolytic solution.

The mass fraction of the constituent unit derived from the crosslinkable alkyl vinyl compound in the vinylidene fluoride copolymer is preferably less than 5 mass %, more preferably from 0.1 mass % to 4 mass %, and even more preferably from 0.3 mass % to 3 mass %.

Furthermore, from the perspective of further enhancing adhesive strength to a surface of a current collector by imparting a hydrogen-bonding polar functional group to the vinylidene fluoride copolymer, the vinylidene fluoride copolymer may have a constituent unit derived from an unsaturated dibasic acid or an unsaturated dibasic acid monoester.

The unsaturated dibasic acid is unsaturated dicarboxylic acid or derivative thereof, and examples thereof include compounds with two carboxyl groups bonded by a linear or branched unsaturated alkylene group having from 1 to 6 carbon atoms. More specific examples of the unsaturated dibasic acid include maleic acid, fumaric acid, itaconic acid, and citraconic acid. On the other hand, the unsaturated dibasic acid monoester is a monoester compound derived from the unsaturated dibasic acid. Examples of the unsaturated dibasic acid monoester include maleic acid monomethyl ester, maleic acid monoethyl ester, citraconic acid monomethyl ester, and citraconic acid monoethyl ester.

Furthermore, from the perspective of further enhancing the adhesion of the vinylidene fluoride copolymer to various constituent materials of the non-aqueous electrolyte secondary battery by imparting a hydrogen-bonding polar functional group to the vinylidene fluoride copolymer, the vinylidene fluoride copolymer may have a constituent unit derived from a compound containing a vinyl group and a polar group (hereinafter, also referred to as "polar group-containing compound"). Examples of the polar group-containing compound include (meth)acrylic acid, 2-carboxyethyl(meth)acrylate, (meth)acryloyloxyethyl succinic acid, (meth)acryloyloxypropyl succinic acid, and glycidyl(meth) acrylate.

The mass fraction of the constituent units derived from the unsaturated dibasic acid, unsaturated dibasic acid monoester, or the polar group-containing compound in the vinylidene fluoride copolymer can be optionally set to be within the range that does not impair the object and effect of the present invention. These introduced amounts can be specified by FT-IR analysis of the vinylidene fluoride copolymer.

(2) Physical Properties of Vinylidene Fluoride Copolymer

The melting point of the vinylidene fluoride copolymer described above is from 105° C. to 125° C., preferably from 106° C. to 123° C., and more preferably from 107° C. to 120° C. When the melting point of the vinylidene fluoride copolymer is within the range described above, the swelling of the vinylidene fluoride copolymer with respect to the electrolytic solution becomes low, or the solubility with respect to N-methylpyrrolidone is enhanced. In addition, when the melting point of the vinylidene fluoride copolymer is higher than 125° C., film formation may be deteriorated, for example, a film is not formed uniformly when forming a film by using the resin composition for a secondary battery. The melting point is a value measured in accordance with ASTM D3418.

In addition, in the vinylidene fluoride copolymer, the mass fraction $W_a$ of the constituent unit derived from the fluorine-containing alkyl vinyl compound in the vinylidene fluoride copolymer, the degree of crystallinity $D_C$ of the vinylidene fluoride copolymer, and the degree of amorphicity $D_A$ of the vinylidene fluoride copolymer satisfy Equation (1) below.

$$4.7 \leq W_a \times (D_C/D_A) \leq 14 \tag{1}$$

The value expressed by $W_a \times (D_C/D_A)$ is preferably 4.8 or greater and 12.5 or less, and more preferably 4.9 or greater and 11 or less. As described above, when the vinylidene fluoride copolymer satisfies Equation (1) above, the solubility or swelling of the resin composition for a secondary battery with respect to the electrolytic solution becomes low, or the solubility with respect to N-methylpyrrolidone is enhanced.

The degree of crystallinity $D_C$ of the vinylidene fluoride copolymer and the degree of amorphicity $D_A$ of the vinylidene fluoride copolymer can be specified as follows.

The degree of crystallinity $D_C$ of the vinylidene fluoride copolymer is obtained from the following equation.

$$\text{Degree of crystallinity } D_C[\%] = \frac{\text{True melting enthalpy of vinylidene fluoride copolymer [J/g]}}{\text{Melting enthalpy of full crystal of polyvinylidene fluoride [J/g]}} \times 100 \quad \text{(Equation 1)}$$

The melting enthalpy of the full crystal of the above polyvinylidene fluoride can be a literature value, for example 104.5 J/g as described in M Neidhofer: Polymer volume 45, Issue 5, 2004, 1679-1688. On the other hand, as for the true melting enthalpy of the vinylidene fluoride copolymer, the vinylidene fluoride copolymer can be calculated by measuring the melting enthalpy of reversing heat flow with a temperature modulation differential scanning calorimeter (for example, Q-100, available from TA Instruments).

On the other hand, the degree of amorphicity $D_A$ of the vinylidene fluoride copolymer can be calculated by the following equation.

$$\text{Degree of amorphicity } D_A[\%] = 100[\%] - \text{degree of crystallinity } D_C[\%]$$

Here, the shape of the vinylidene fluoride copolymer in the resin composition for a secondary battery is not particularly limited and for example, it may be dissolved in a solvent, or may be contained in a particulate shape state (primary particle or secondary particle) in the resin composition for a secondary battery. In addition, in a case where the vinylidene fluoride copolymer is in a solid state (for example, a particulate shape) in the resin composition for a secondary battery, the average particle size can be selected as appropriate depending on the application of the resin composition for a secondary battery and the state of the vinylidene fluoride copolymer being contained in the resin composition for a secondary battery. For example, in a case where the resin composition for a secondary battery contains a dispersion medium and the vinylidene fluoride copolymer is dispersed in the dispersion medium, the vinylidene fluoride copolymer is mainly a primary particle. In this case, the average particle size (average primary particle size) is preferably from 10 nm to 700 μm, more preferably from 20 nm to 600 nm, and even more preferably from 30 nm to 500 nm. The primary particle size is calculated by the normalization analysis of a dynamic light scattering method. Specifically, the measurement is performed in accordance with JIS Z 8828. In addition, among the two large and small peaks obtained through the normalization analysis, the large peak is set as an average primary particle size.

On the other hand, when the shape of the resin composition for a secondary battery is powder, the vinylidene fluoride copolymer is often a secondary particle. In this case, the average particle size (average secondary particle size) is preferably from 30 μm to 200 μm, more preferably from 35 μm to 190 μm, and even more preferably from 40 μm to 180 μm. The average secondary particle size is measured by a laser diffraction/scattering method and is calculated from the cumulative average diameter (d50) of the particle size distribution.

(3) Method for Preparing Vinylidene Fluoride Copolymer

The vinylidene fluoride copolymer that satisfies the physical properties described above can be prepared by polymerizing vinylidene fluoride, a fluorine-containing alkyl vinyl compound, and other compounds as necessary under specific conditions by an emulsion polymerization method.

In the emulsion polymerization method, vinylidene fluoride, a fluorine-containing alkyl vinyl compound, and other compounds (hereinafter, also referred to collectively as "monomers"), a liquid medium, and an emulsifier are mixed in an autoclave. At this time, the liquid medium is a liquid in which vinylidene fluoride or the like is hardly soluble. Then, a polymerization initiator that can be dissolved in the liquid medium is added to the mixed solution to polymerize vinylidene fluoride, the fluorine-containing alkyl vinyl compound, and the like.

Here, the pressure within the autoclave during polymerization is preferably maintained at approximately the same pressure for a certain period of time from the start of the polymerization, and the pressure is preferably maintained at the same pressure from the polymerization initiation (0% polymerization rate) until the polymerization rate is at least 90%. Examples of a method for maintaining the pressure at the start of the polymerization include a method for adding a monomer immediately after adding the initiator. In addition, the added monomer is preferably vinylidene fluoride and is preferably substantially only the vinylidene fluoride copolymer. Furthermore, the pressure in the autoclave during polymerization is preferably from 0 to 20 MPa, more preferably from 0.5 to 15 MPa, and even more preferably from 1 to 10 MPa. By adjusting the pressure during the polymerization to be within the range described above, a vinylidene fluoride copolymer having a melting point and a value expressed by $W_a \times (D_C/D_A)$ falling within the range described above can be obtained.

The liquid medium used in the emulsion polymerization is not particularly limited as long as the monomer is hardly soluble in the liquid. The vinylidene fluoride and the like are hardly soluble in water. Thus, water is used as an example of the liquid medium.

On the other hand, the emulsifier is not particularly limited as long as it is capable of forming micelles of monomers in a liquid medium and capable of stably dispersing the copolymer to be synthesized in the liquid medium, and for example, a known surfactant can be used. The emulsifier may be a non-ionic surfactant, a cationic surfactant, an anionic surfactant, or an amphoteric surfactant, or these may be used in combination. Examples of the emulsifier include a perfluorinated surfactant, a partially fluorinated surfactant, and a non-fluorinated surfactant, which are used in the polymerization of polyvinylidene fluoride in the related art. Among the surfactants, perfluoroalkyl sulfonic acid and a salt thereof, perfluoroalkyl carboxylic acid and a salt thereof, and a fluorine-based surfactant having a fluorocarbon chain or a fluoropolyether chain are preferable, and perfluoroalkyl carboxylic acid and a salt thereof are more preferable. As the emulsifier, one selected from the above can be used alone or in combination of two or more. The added amount of the emulsifier is preferably from 0.0001 to 22 parts by mass when the total amount of monomers used in the polymerization is 100 parts by mass.

The polymerization initiator is not particularly limited as long as the polymerization initiator is a compound that is soluble in the liquid medium and that can polymerize a monomer. Examples of the polymerization initiator include known a water-soluble peroxide, a water-soluble azo-based compound, and a redox initiator. Examples of the water-soluble peroxide include ammonium persulfate and potassium persulfate. Examples of the water-soluble azo compound include 2,2'-azobis-isobutyronitrile (AIBN) and 2,2'-azobis-2-methylbutyronitrile (AMBN). Examples of the redox initiator include ascorbic acid-hydrogen peroxide. Among these, the water-soluble peroxide is preferable from the perspective of reactivity and the like. These polymerization initiators may be used alone or as a combination of two or more types. The added amount of the polymerization initiator is preferably from 0.01 to 5 parts by mass when the total amount of monomers used in the polymerization is 100 parts by mass.

Note that the emulsion polymerization method may be a soap-free emulsion polymerization method or a mini-emulsion polymerization method or a seed emulsion polymerization.

The soap-free emulsion polymerization method is an emulsion polymerization performed without using an ordinary emulsifier that is used in the above-described emulsion polymerization. The vinylidene fluoride copolymer obtained by soap-free emulsion polymerization is preferred because the emulsifier was not remained in the copolymer particle.

In addition, in the soap-free emulsion polymerization method, as the emulsifier, a reactive emulsifier having a polymerizable double bond in the molecule. The reactive emulsifier forms the micelles in the system at the beginning of the polymerization; however, as the polymerization proceeds, the reactive emulsifier is used as a monomer in the polymerization reaction and consumed. Therefore, there is almost no free state in the final resulting reaction system. Therefore, there is an advantage that the reactive emulsifier is difficult to bleed out to the particle surface of the obtained vinylidene fluoride copolymer.

Examples of the reactive emulsifier include polyoxyalkylene alkenyl ether, sodium alkyl allyl sulfosuccinate, methacryloyloxy polyoxypropylene sodium sulfate, and alkoxy polyethylene glycol methacrylate.

On the other hand, in the mini-emulsion polymerization method, a strong shearing force is applied using an ultrasonic oscillator or the like to miniaturize the monomer oil droplets to a submicron size, and then polymerization is performed. At this time, a known hydrophobe is added to the mixed solution to stabilize the miniaturized monomer oil droplets. In the mini-emulsion polymerization method, a polymerization reaction ideally occurs only in each monomer oil droplet, and each oil droplet becomes a vinylidene fluoride copolymer (fine particles). Therefore, the particle size, particle size distribution, and the like of the obtained vinylidene fluoride copolymer are easily controlled.

Seed emulsion polymerization is a polymerization performed by coating the fine particle obtained by the above-described polymerization method with a polymer formed from other monomers. A monomer, a liquid medium, a surfactant, a polymerization initiator, or the like is further added to the fine particle dispersion and polymerized.

Here, in any of the emulsion polymerization methods described above, a chain transfer agent may be used to adjust the degree of polymerization of the obtained vinylidene fluoride copolymer particle. Examples of the chain transfer agent include ethyl acetate, methyl acetate, diethyl carbonate, acetone, ethanol, n-propanol, acetaldehyde, propylaldehyde, ethyl propionate, and carbon tetrachloride.

Additionally, if needed, a pH adjusting agent may be used. Examples of the pH adjusting agent include an electrolyte substance having a buffer capacity such as sodium dihydrogen phosphate, disodium hydrogen phosphate, and potassium dihydrogen phosphate; and a basic substrate such as sodium hydroxide, potassium hydroxide, barium hydroxide, calcium hydroxide, and ammonia.

Additionally, other optional components such as an anti-settling agent, a dispersion stabilizer, a corrosion inhibitor, an anti-fungal agent, and a wetting agent may be used, if needed. The added amount of these optional components is preferably from 5 ppm to 10 parts by mass, and more preferably from 10 ppm to 7 parts by mass when the total amount of monomers used in the polymerization is 100 parts by mass.

In the polymerization of the vinylidene fluoride copolymer, the polymerization temperature may be selected appropriately depending on a factor such as the type of polymerization initiator. For example, the temperature may be set to from 0° C. to 120° C., preferably from 20° C. to 110° C., and more preferably from 40° C. to 100° C. Although the polymerization time is not particularly limited, the polymerization time is preferably from 1 to 24 hours considering the productivity.

According to the emulsion polymerization method described above, latex in which vinylidene fluoride copolymer particles are substantially uniformly dispersed in water is obtained when water is used as the liquid medium. The latex containing the vinylidene fluoride copolymer obtained in this manner may be used as is. In addition, the latex may be pulverized and used in at least one type of method selected from salting, freeze milling, spray drying, freeze drying, and the like. Furthermore, a pulverized vinylidene fluoride copolymer may be used by being physically or chemically redispersed in the dispersion medium. In addition, water, a surfactant, a pH adjusting agent, an anti-settling agent, a dispersion stabilizer, a corrosion inhibitor, an anti-fungal agent, and a wetting agent may be further added in the dispersion (latex) containing the untreated vinylidene fluoride copolymer particle, or impurities may be removed by dialysis membrane or ion exchange resin.

1-2. Other Components

The resin composition for a secondary battery may contain components other than the vinylidene fluoride copolymer (other components), and examples thereof include a water-soluble polymer, a filler, a solvent (a dispersion medium), various additives, and the like.

When the resin composition for a secondary battery contains a water-soluble polymer, the viscosity of the resin composition for a secondary battery is adjusted, and the dispersibility of the solid content of the resin composition for a secondary battery is enhanced. Examples of the water-soluble polymer include: cellulose compounds such as carboxymethyl cellulose (CMC), methyl cellulose, hydroxypropyl cellulose, hydroxypropyl methylcellulose, and hydroxyethyl cellulose; ammonium salts or alkali metal salts of the above-mentioned cellulose compounds; polycarboxylic acids such as poly(meth)acrylic acid and modified poly(meth)acrylic acid; alkali metal salts of the above-mentioned polycarboxylic acids; polyvinyl alcohol-based (co)polymers such as polyvinyl alcohol, modified polyvinyl alcohol, and ethylene-vinyl alcohol copolymer; and water-soluble polymers, including saponified compounds of copolymers of unsaturated carboxylic acids such as (meth)acrylic acid, maleic acid, and fumaric acid with polyvinylpyrrolidone, polyethylene oxide, polyvinyl butyral or vinyl ester. Among them, cellulose compounds and salts thereof are preferred. The resin composition for a secondary battery may contain only one type of water-soluble polymer or may contain two or more types thereof.

The amount of the water-soluble polymer is not particularly limited, and in one example, the amount can be set to from 0.01 mass % to 20 mass % with respect to the total amount of solid content of the resin composition for a secondary battery.

When the resin composition for a secondary battery contains a filler, the heat resistance and the ionic permeability of the layer obtained from the resin composition for a secondary battery can be improved. The filler may be an inorganic filler or an organic filler, and the inorganic filler is preferable from the perspective of the heat resistance of the layer obtained from the resin composition for a secondary battery. Examples of the inorganic filler include oxides such as silicon dioxide ($SiO_2$), alumina ($Al_2O_3$), titanium dioxide ($TiO_2$), calcium oxide (CaO), strontium oxide (SrO), barium oxide (BaO), magnesium oxide (MgO), zinc oxide (ZnO), and barium titanate ($BaTiO_3$); hydroxides such as magnesium hydroxide ($Mg(OH)_2$), calcium hydroxide ($Ca(OH)_2$), zinc hydroxide ($Zn(OH)_2$), aluminum hydroxide ($Al(OH)_3$), and aluminum hydroxide oxide (AlO(OH)); carbonates such as calcium carbonate ($CaCO_3$); sulfates such as barium sulfate; nitrides; clay minerals; and boehmite. The resin composition for a secondary battery may contain only one type of filler or may include two or more types thereof. From the perspective of the safety of secondary battery and the safety of the resin composition for a secondary battery, as the filler, alumina, silicon dioxide, magnesium oxide, magnesium hydroxide, magnesium carbonate, zinc oxide, and boehmite are preferred.

The average particle size of the fillers is preferably from 5 nm to 2 μm and more preferably from 10 nm to 1 μm. The average particle size is measured in accordance with JIS Z 8828. Here, the amount of the filler is preferably from 10 mass % to 900 mass % with respect to the total amount of vinylidene fluoride copolymer in the resin composition for a secondary battery.

The resin composition for a secondary battery may contain a dispersion medium for dispersing the vinylidene fluoride copolymer or the like. The dispersion medium is preferably water, and a non-aqueous solvent that does not dissolve the vinylidene fluoride resin and can be dispersed, suspended, or emulsified can also be preferably used. Examples of the non-aqueous solvent include: amide compounds such as dimethylformamide, and N,N-dimethylacetamide; hydrocarbons such as toluene, xylene, n-dodecane, and tetralin; alcohols such as methanol, ethanol, isopropyl alcohol, 2-ethyl-1-hexanol, 1-nonanol, and lauryl alcohol; ketones such as acetone, methyl ethyl ketone, cyclohexanone, holon, acetophenone, and isophorone; esters such as benzyl acetate, isopentyl butyrate, methyl lactate, ethyl lactate, and butyl lactate; amine compounds such as o-toluidine, m-toluidine, and p-toluidine; lactones such as γ-butyrolactone and δ-butyrolactone, sulfoxide or sulfone compounds such as dimethyl sulfoxide, and sulfolane. These water or non-aqueous solvents may be used alone or as a mixed solvent in which water and non-aqueous solvents are mixed. At this time, two or more types of non-aqueous solvents may be combined.

The resin composition for a secondary battery may contain a solvent for dissolving the vinylidene fluoride copolymer or the like. In this case, the solvent is preferably N-methylpyrrolidone; however, the solvent is not particularly limited as long as it is a solvent that can dissolve at least a part of the vinylidene fluoride copolymer resin and that can disperse, suspend, or emulsify the filler without dissolving the filler. These solvents may be formed of only one type or may be a mixed solvent in which two or more types of solvents are mixed.

In a case of using the dispersion medium or solvent, the amount of the dispersion medium or solvent in the resin composition for a secondary battery is preferably from 60 to 3500 parts by mass with respect to 100 parts by mass of the vinylidene fluoride copolymer. In addition, the amount of the solvent (dispersion medium) is not particularly limited and is preferably from 30 mass % to 99 mass % and more preferably from 35 to 98 parts by mass, with respect to the total amount of the resin composition for a secondary battery.

Examples of various additives include a dispersion stabilizer, a pH adjusting agent, a thickener, an anti-settling agent, a corrosion inhibitor, an anti-fungal agent, and a wetting agent. A known compound can be used as the various additives. Examples of the dispersion stabilizer include the above-described surfactants (emulsifiers used in the preparation of the vinylidene fluoride copolymer described above). Examples of the pH adjusting agent include an electrolyte substance having a buffer capacity such as $Na_2HPO_4$, $NaH_2PO_4$, and $KH_2PO_4$; and a basic substance such as sodium hydroxide, potassium hydroxide, barium hydroxide, calcium hydroxide, and ammonia. These amounts are optionally selected within a range that does not impair the object and effect of the present invention.

1-3. Method for Producing Resin Composition for Secondary Battery and Application of Resin Composition for Secondary Battery The resin composition for a secondary battery described above can be prepared by mixing the vinylidene fluoride copolymer described above with other components as necessary. The method for mixing these is not particularly limited, and mixing can be performed by a known method.

For example, in a case where the vinylidene fluoride copolymer (particles) is in a state being dispersed in the dispersion medium in the resin composition for a secondary battery, the vinylidene fluoride copolymer particles and the dispersion medium obtained by the emulsion polymerization method described above may be used as the resin composition for a secondary battery. Alternatively, the vinylidene fluoride copolymer particles obtained by the emulsion polymerization described above may be pulverized, mixed with other components or the like as necessary, and then physically or chemically redispersed in a separately prepared dispersion medium to be used as the resin composition for a secondary battery. Examples of methods for pulverization include, but are not limited to, methods such as salting, freeze milling, spray drying, and freeze drying.

On the other hand, when the vinylidene fluoride copolymer is dissolved in a solvent in the resin composition for a secondary battery, the vinylidene fluoride copolymer particles obtained by the emulsion polymerization described above may be pulverized and then dissolved in a solvent to be used as the resin composition for a secondary battery. The pulverizing method can be the same as described above, but is not limited thereto.

In addition, when the resin composition for a secondary battery is a powder, the vinylidene fluoride copolymer particles obtained by the emulsion polymerization described above may be pulverized and used as is as the resin composition for a secondary battery or may be mixed with other components or the like as necessary, and this mixture may be used as the resin composition for a secondary battery. The pulverizing method can be the same as described above, but is not limited thereto.

Here, the vinylidene fluoride copolymer in the resin composition for a secondary battery described above is resistant to the swelling caused by the electrolytic solution. In addition, the vinylidene fluoride copolymer can be dissolved in N-methylpyrrolidone, and thus a film can be formed uniformly. Therefore, the resin composition for a secondary battery can be suitably used in an electrode mixture layer of an electrode for the non-aqueous electrolyte secondary battery, a resin layer of the separator, an electrolyte layer, and the like. In addition, the vinylidene fluoride copolymer in the resin composition for a secondary battery described above has high adhesion to various constituent materials of the non-aqueous electrolyte secondary battery.

2. Separator for Non-Aqueous Electrolyte Secondary Battery

The separator for a non-aqueous electrolyte secondary battery of the present invention (hereinafter, also simply referred to as "separator") includes a separator film and a resin layer disposed on at least one surface of the separator film, in which the resin layer contains at least a solid content of the resin composition for a secondary battery. However, in a case where the resin layer itself can serve as a separator, the separator may not include the separator film.

2-1. Separator Film

The separator film can be set as a film which is electrically stable and has no electrical conductivity. A porous substrate having pores or voids inside is used for the separator, and it is preferable that the separator is a porous substrate having excellent ionic permeability. Examples of the porous substrate include: polyolefin-based polymers (for example, polyethylene or polypropylene), polyester-based polymers (for example, polyethylene terephthalate), polyimide-based polymers (for example, aromatic polyamide polymers or polyetherimides), polyethersulfones, polysulfone, polyether ketone, polystyrene, polyethylene oxides, polycarbonates, polyvinyl chlorides, polyacrylonitriles, polymethyl methacrylates, ceramics, and a porous film of a single layer or multilayer obtained by mixtures of at least two types thereof; nonwovens; glass; and paper. Note that the polymer may be a modified product.

The material for the separator film is preferably polyolefin-based polymers (for example, polyethylene or polypropylene). From the perspective of the shutdown function, the inclusion of polyethylene is more preferred. From the perspective of the shutdown function and heat resistance, the inclusion of 95 mass % or greater of polyethylene and 5 mass % or less of polypropylene is even more preferred.

Examples of the separator film obtained by a polyolefin-based polymer includes: a single-layered polypropylene separator, a single-layered polyethylene separator, a three-layered polypropylene/polyethylene/polypropylene separator, and the like that are commercially available as Celgard (trade name, available from Polypore Corporation).

The thickness of the separator film (porous substrate) is preferably from 3 μm to 25 μm and more preferably from 5 μm to 25 μm, from the perspective of the mechanical properties and the internal resistance.

The surface of the separator film (porous substrate) may be subjected to a corona treatment, a plasma treatment, a flame treatment, or an ultraviolet irradiation treatment in order to improve the adhesion with resin layer (the wettability of the resin composition for a secondary battery described above).

2-2. Resin Layer

The resin layer may contain the solid content of the resin composition for a secondary battery described above and may further contain other components as necessary. The resin layer may be a layer for enhancing the strength of the separator, may be a layer for binding the separator and the electrode, or may be a layer that simultaneously serves these functions. In the resin layer, the vinylidene fluoride copolymer described above may have a particulate shape, may have a film shape (including a porous film), or may have a gel shape containing a solvent.

The amount of the vinylidene fluoride copolymer in the resin layer is preferably from 10 mass % to 100 mass %. When the amount of the vinylidene fluoride copolymer is within this range, the adhesion between the resin layer and the separator film tends to increase, the adhesion between the resin layer and the electrode tends to increase, the strength of the separator tends to increase, and the strength of the resin layer itself tends to increase. The thickness of the resin layer is appropriately selected according to the function of the resin layer and is not particularly limited.

The method for forming the resin layer is not particularly limited, and for example, in a case where the resin composition for a secondary battery described above is a liquid (including a solvent or a dispersion medium), the resin layer can be formed by applying the resin composition for a secondary battery and then drying the solvent or dispersion medium. Note that, as necessary, any component may be added to the resin composition for a secondary battery, and this may be applied. On the other hand, in a case where the shape of the resin composition for a secondary battery is a powder or a bulk, the resin composition for a secondary battery is mixed with a solvent (dispersion medium) or other components as necessary, and the mixed solution is applied. Then, it can be formed by drying the solvent (dispersion medium) from the coating film. The method for applying these is not particularly limited, and a doctor blade method, a reverse roll method, a comma bar method, a gravure method, an air knife method, a die coating method, and a dip coating method can be adopted.

In addition, when drying the resin layer formed of the resin composition for a secondary battery, it is preferably performed to such a degree that at least a part of the solvent (dispersion medium) in the resin layer can be removed. The drying may be performed for multiple times at various temperatures and during the drying, pressure may be applied. After the drying, a heat treatment may be further performed. For example, the drying temperature is preferably from 40° C. to 150° C. and more preferably 45° C. to 130° C., and the drying time can be set from 1 minute to 15 hours.

The resin layer may be disposed on at least one surface or on both surfaces of the separator provided between a negative electrode layer and a positive electrode layer.

3. Electrode for Non-Aqueous Electrolyte Secondary Battery

According to the present invention, an electrode for a secondary battery includes a current collector and an electrode mixture layer disposed on the current collector, in which the electrode mixture layer may contain at least a solid content of a resin composition for an electrode mixture layer, which will be described later. The electrode for a secondary battery may be for a positive electrode or for a negative electrode.

3-1. Current Collector

The current collector for the negative electrode and the positive electrode is a terminal for producing electricity. The material of the current collector is not particularly limited, and metal foil such as aluminum, copper, iron, stainless steel, steel, nickel, and titanium; or metal steel can be used as the material of the current collector. Furthermore, the surface of another medium may be coated with the above metal foil, metal steel, or the like.

3-2. Resin Composition for Electrode Mixture Layer and Electrode Mixture Layer On the other hand, the electrode mixture layer can be a layer in which the resin composition for a secondary battery described above is mixed with the electrode active material to prepare a resin composition for an electrode mixture layer, and the resin composition for an electrode mixture layer can be applied on the current collector and dried. The electrode mixture layer may be formed only on one surface of the current collector and is preferably disposed on both surfaces.

Here, the electrode mixture layer may be a layer for binding the current collector and the active material, may be a layer for binding the active materials to each other, may be a layer for binding the active material and the other components, or may be a layer for binding the secondary battery electrode and the separator described above. In the electrode mixture layer, the vinylidene fluoride copolymer in the resin composition for a secondary battery described above may have a particulate shape, may have a film shape (including a porous film), or may have a gel shape containing a solvent.

The electrode mixture layer may contain, for example, the solid content of the resin composition for a secondary battery described above; and the electrode active material and may contain other components as necessary. Examples of the other component include a conductive auxiliary agent, a solid electrolyte, a pigment dispersant, and an adhesion auxiliary agent.

The amount of the vinylidene fluoride copolymer with respect to the total amount of the electrode mixture layer is preferably 0.1 mass % or more and 50 mass % or less, more preferably 0.2 mass % or greater and 40 mass % or less, and even more preferably 0.3 mass % or greater and 30 mass % or less. When the amount of the vinylidene fluoride copolymer is within this range, adhesion between the electrode mixture layer and the current collector, for example, tends to be favorable.

The electrode active material contained in the electrode mixture layer is not particularly limited. For example, a known electrode active material for the negative electrode (negative electrode active material) or electrode active material for the positive electrode (positive electrode active material) can be used.

Examples of the negative electrode active material include carbon materials such as artificial graphites, natural graphites, non-graphitizable carbon, graphitizable carbon, activated carbon, and one obtained by calcinating phenol resins and pitch; metal and metal alloy materials such as Cu, Li, Mg, B, Al, Ga, In, Si, Ge, Sn, Pb, Sb, Bi, Cd, Ag, Zn, Hf, Zr and Y; and metal oxides such as GeO, $GeO_2$, SnO, $SnO_2$, PbO, and $PbO_2$. Note that the negative electrode active material may be a commercially available product.

On the other hand, a lithium-based positive electrode active material containing at least lithium is preferable as an active material for a positive electrode. Examples of the lithium-based positive electrode active material include: complex metal chalcogenide compounds represented by the general formula $LiMY_2$ (where M is at least one or more of transition metals such as Co, Ni, Fe, Mn, Cr, or V, and Y is a chalcogen element such as O or S) such as $LiCoO_2$ or $LiNi_xCo_{1-x}O_2$ ($0<x\leq1$); complex metal oxides having a spinel structure such as $LiMn_2O_4$; and olivine-type lithium compounds such as $LiFePO_4$. Note that the positive electrode active material may be a commercially available product.

In addition, the conductive auxiliary agent is not particularly limited as long as it is a compound capable of further enhancing electrical conductivity between electrode active materials or between an electrode active material and a current collector. Examples of the conductive auxiliary agent include acetylene black, Ketjen black, carbon black, graphite powder, carbon nanofibers, carbon nanotubes, and carbon fibers.

The amount of the conductive auxiliary agent can be optionally set depending on the type and the type of the battery. From the perspective of improving conductivity and increasing dispersibility of the conductive auxiliary agent, in one example, the amount of the conductive auxiliary agent is 0.1 mass % or greater and 15 mass % or greater, more preferably 0.1 mass % or greater and 7 mass % or less, and even more preferably 0.1 mass % or greater and 5 mass % or less, with respect to the total amount of the electrode active material, the vinylidene fluoride copolymer, and the conductive auxiliary agent.

The solid electrolyte is not particularly limited as long as it is a solid compound having ionic conductivity, and a known inorganic solid electrolyte and a polymer solid electrolyte can be used. Examples of the inorganic solid electrolyte include an oxide-based solid electrolyte, a sulfide-based solid electrolyte, a nitride-based solid electrolyte, and a complex hydride solid electrolyte. Examples of the polymer solid electrolyte include a gel-based electrolyte and an intrinsic polymer electrolyte.

Examples of the oxide-based solid electrolyte include, but are not limited to, perovskite-type LLTO, garnet-type LLZ, a NASICON-type compound, a LISICON-type compound, a LIPON-type compound, and a β-alumina-type compound. Specific examples include: $Li_3PO_4$, $Li_{0.34}La_{0.51}TiO_3$, $Li_{1.3}Al_{0.3}Ti_{1.7}(PO_4)_3$, $Li_7La_3Zr_2O_{12}$, $Li_6BaLa_2Ta_2O_{12}$, $Li_{2.9}PO_3.3N_{0.46}$, $Li_{4.3}Al_{0.3}Si_{0.7}O_4$, $50Li_4SiO_4$-$50Li_3BO_3$, $Li_2O$—$Al_2O_3$—$SiO_2$—$P_2O_5$—$TiO_2$, and $Li_{1.5}Al_{0.5}Ge_{1.5}(PO_4)_3$-$0.05Li_2O$.

Examples of the sulfide-based solid electrolyte include, but are not limited to, a LGPS-type compound, an aldyrodite-type compound, an amorphous-based compound, and a Li—P—S-based compound. Specific examples thereof include $Li_{10}GeP_2S_{12}$, $Li_{3.25}Ge_{0.25}P_{0.75}S_4$, $0.03Li_3PO_4$-$0.59Li_2S$-$0.38SiS_2$, $57Li_2S$-$38SiS_2$-$5Li_3PO_4$, $70Li_2S$-$30P_2S_5$, and Specific examples of the nitride-based solid electrolyte include, but are not limited to, $LiN_3$.

Specific examples of the complex hydride solid electrolyte include, but are not limited to, $LiBH_4$.

Specific examples of the gel-based electrolyte include, but are not limited to, Poly(ethylene oxide)$_8$-$LiClO_4$ (ethylene carbonate (EC)+propylene carbonate (PC)), Poly(ethylene oxide)$_8$-$LiClO_4$(PC), Poly(vinylidene fluoride)-LiN$(CF_3SO_2)_2$ (EC+PC), Poly(vinyllidene fluoride-co-hexafluoropropylene)-LiPF6 (EC+diethyl carbonate (DEC)+dimethyl carbonate (DMC)), Poly(ethylene glycol acrylate)-LiClO$_4$(PC), and Poly(acrylonitrile)-LiClO$_4$ (EC+PC) Poly(methyl methacrylate)-LiClO$_4$(PC).

Specific examples of the intrinsic polymer electrolytes include, but are not limited to, poly(ethylene oxide)$_8$-LiClO$_4$, Poly(oxymethylene)-LiClO$_4$, Poly(propyrene oxide)$_8$-LiClO$_4$, Poly(dimethyl siloxane)-LiClO$_4$, Poly(vinylidene fluoride-co-hexafluoropropyrene)-LiTFSI, Poly(2,2-dimethylpropoxyle carbonate)-LiFSI, and Poly[(2-methoxy)ethylglycidyl ether]$_8$-LiClO$_4$.

These solid electrolytes may contain only one type or two or more types of the electrolytes.

Examples of the pigment dispersant include polyvinylpyrrolidone. Examples of the adhesion auxiliary agent include cellulose compounds such as polyacrylic acid, polymethacrylic acid, polyimide, carboxymethylcellulose; and an ammonium salt and an alkali metal salt of the cellulose compound. These amounts are not particularly limited as long as the amounts are within the range that does not impair the object and effect of the present invention.

Examples of other resins include vinylidene fluoride copolymers other than the above-described vinylidene fluoride copolymer, polytetrafluoroethylene (PTFE), styrene/butadiene rubber (SBR), and polyacrylonitrile (PAN). The content of the other resin is not particularly limited as long as it does not impair the object and effect of the present invention.

Here, the thickness of the electrode mixture layer is not particularly limited and can be any thickness. In the electrode, the electrode mixture layer may be provided in contact with the above separator.

The electrode mixture layer can be formed by applying, onto a current collector, and drying a resin composition for an electrode mixture layer in which the resin composition for a secondary battery or an electrode active material is mixed with a solvent (dispersion medium) or a thickener as necessary.

The solvent (dispersion medium) is not particularly limited, and the solvent (dispersion medium) described in the resin composition for a secondary battery can be used. These solvents (dispersion medium) may contain only one type or two or more types thereof.

Additionally, a known compound can be used as the thickener, and the amount thereof is appropriately selected based on the viscosity of the resin composition for an electrode mixture layer.

The method for forming the electrode mixture layer is not particularly limited, and for example, when the above-described resin composition for a secondary battery is a liquid (including a solvent or a dispersion medium), the electrode mixture layer may be formed by applying and drying the resin composition for an electrode mixture layer obtained by mixing the electrode active material with the resin composition for a secondary battery. Note that, as necessary, any component may be added other than the resin composition for a secondary battery and the electrode active material, and this may be applied. On the other hand, in a case where the shape of the resin composition for a secondary battery is a powder or a bulk, the resin composition for an electrode mixture layer is prepared by mixing the resin composition for a secondary battery and the electrode active material with a solvent (dispersion medium) or other components as necessary. Then, the electrode mixture layer can be formed by applying and drying the resin composition for an electrode mixture layer. The method for applying these is not particularly limited, and a doctor blade method, a reverse roll method, a comma bar method, a gravure method, an air knife method, a die coating method, and a dip coating method can be adopted. Furthermore, after application, it is common to heat the resin composition for an electrode mixture layer at any temperature and dry the solvent. The drying may be performed for multiple times at various temperatures. During the drying, pressure may be applied. After the drying, a heat treatment may be further performed. In one example, the heat treatment is performed at from 100° C. to 300° C. for from 10 seconds to 300 minutes.

After the coating and drying, press treatment may be further performed. In one example, the press treatment is performed at from 1 MPa to 200 MPa. By performing the press treatment, electrode density can be enhanced.

4. Non-Aqueous Electrolyte Secondary Battery

The non-aqueous electrolyte secondary battery of the present invention may include a separator including at least a positive electrode and a negative electrode and disposed between the positive electrode and the negative electrode. The non-aqueous electrolyte secondary battery includes an electrode for a non-aqueous electrolyte secondary battery described above as a positive electrode and/or a negative electrode. Furthermore, as the separator, the separator for a non-aqueous electrolyte secondary battery described above may be included.

In the non-aqueous electrolyte secondary battery, the positive electrode, the negative electrode, and the electrolyte are typically combined. The electrolyte can be, for example, a liquid in which an electrolyte is dissolved in a non-aqueous solvent. Examples of the non-aqueous solvent include cyclic carbonates such as propylene carbonate (PC), ethylene carbonate (EC), butylene carbonate, fluoroethylene carbonate, and difluoroethylene carbonate; linear carbonates such as dimethyl carbonate (DMC), diethyl carbonate (DEC), ethyl methyl carbonate (EMC), and fluorine substitutions thereof; cyclic esters such as y-butyrolactone and y-valerolactone; dimethoxyethane; diethoxyethane; tetrahydrofuran; 2-methyl tetrahydrofuran; sulfolane; and 1,3-dioxolane. These non-aqueous solvents can be used alone or in combination of two or more types. The vinylidene fluoride copolymer in the above-described resin composition for a secondary battery is hardly swelled or dissolved by these non-aqueous solvents and thus can be a highly stable non-aqueous electrolyte secondary battery.

In addition, an ionic liquid can also be used as the electrolyte. The ionic liquid is not particularly limited, and a known ionic liquid can be used, and examples thereof include an ethyl methyl imidazolium salt and a butyl methyl imidazolium salt. The ionic liquid may be dissolved in the non-aqueous solvent described above and may be used as is.

Furthermore, the electrolyte may also be used as a solid without being dissolved in the non-aqueous solvent. The electrolyte used in the secondary battery according to the present embodiment is not particularly limited. For example, a known electrolyte in the secondary battery can be used. Examples of the electrolyte include LiClO$_4$, LiPF$_6$, LiBF$_4$, LiCF$_3$SO$_3$, LiAsF$_6$, LiCl, LiBr, LiB(C$_6$H$_5$)$_4$, LiSbF$_6$, LiC$_4$F$_9$SO$_3$, Li(CF$_3$SO$_2$)$_3$C, LiBPh$_4$, LiN(SO$_3$CF$_3$)$_2$, Li(FSO$_2$)$_2$N(LiFSI), and Li(CF$_3$SO$_2$)$_2$N (LiTFSI).

EXAMPLES

The present invention will be described in further detail below with reference to examples. The scope of the present invention is not to be construed as being limited by these examples.

Example 1

To an autoclave was added 280 parts by mass of ion-exchanged water and degassed by nitrogen bubbling for 30 min. Next, 0.2 parts by mass of disodium hydrogen phosphate and 1.0 parts by mass of perfluorooctanoate ammonium salt (PFOA) as a surfactant were added. The autoclave was pressured to 4.5 MPa and then nitrogen was purged for three times. After that, 0.1 parts by mass of ethyl acetate, 13 parts by mass of vinylidene fluoride (VDF), and 22 parts by mass of hexafluoropropylene (HFP) were added to the autoclave. The temperature was raised to 80° C. while stirred. Then, 5 mass % of ammonium persulfate (APS) aqueous solution was added so that the APS amount became 0.06 parts by mass, and then polymerization was started. An in-can pressure at this time was set to 2.5 MPa. 65 parts by mass of VDF were continuously added immediately after polymerization was started so that the in-can pressure was maintained at 2.5 MPa at the start of the polymerization. After addition, the polymerization was completed when the pressure was dropped to 1.5 MPa, and a latex (resin composition) was obtained. The solid content concentration of the obtained latex (concentration of vinylidene fluoride copolymer) was 21.0 mass %, and an average primary particle size of the vinylidene fluoride copolymer contained in the latex was 180 nm. When the latex was freeze-dried and only the vinylidene fluoride copolymer was taken out, the freeze-dried product had a secondary particle size of 88 μm. At this time, the freeze-dried product was obtained by freezing the latex after polymerization with liquid nitrogen and drying under reduced pressure at room temperature. Note that the solid content concentration, the average primary particle size, and the average secondary particle size were measured by the method described below.

Example 2

A latex (resin composition) was obtained by polymerization in the same manner as in Example 1 except that before the start of polymerization, the amount of VDF added all at once in an autoclave was changed from 13 parts by mass to 8 parts by mass, and the amount of HFP was changed from 22 parts by mass to 27 parts by mass. The solid content concentration of the obtained latex (concentration of vinylidene fluoride copolymer) was 21.3 mass %. The average primary particle size of the vinylidene fluoride copolymer contained in the latex was 190 nm, and the secondary particle size of the vinylidene fluoride copolymer (freeze-dried product) was 89 μm.

Example 3

A latex (resin composition) was obtained by polymerization in the same manner as in Example 1 except that before the start of polymerization, the amount of VDF added all at once in an autoclave was changed from 13 parts by mass to 5 parts by mass, and the amount of HFP was changed from 22 parts by mass to 30 parts by mass. The solid content concentration of the obtained latex (concentration of vinylidene fluoride copolymer) was 22.3 mass %. The average primary particle size of the vinylidene fluoride copolymer contained in the latex was 220 nm, and the secondary particle size of the vinylidene fluoride copolymer (freeze-dried product) was 161 μm.

Example 4

A latex (resin composition) was obtained by performing polymerization in the same manner as in Example 2. The solid content concentration of the obtained latex (concentration of vinylidene fluoride copolymer) was 21.3 mass %. The average primary particle size of the vinylidene fluoride copolymer contained in the latex was 180 nm, and the secondary particle size of the vinylidene fluoride copolymer (spray-dried product) was 54 μm. The conditions for a spray drying operation at this time were an inlet temperature of 170° C., an outlet temperature of 100° C., a latex throughput of 3 kg/hr, and a rotation speed of 15000 rpm.

Example 5

A latex (resin composition) was obtained by polymerization in the same manner as in Example 1 except that before the start of polymerization, the amount of VDF added all at once in an autoclave was changed from 13 parts by mass to 18 parts by mass, and the amount of HFP was changed from 22 parts by mass to 17 parts by mass. The solid content concentration of the obtained latex (concentration of vinylidene fluoride copolymer) was 20.9 mass %. The average primary particle size of the vinylidene fluoride copolymer contained in the latex was 170 nm, and the secondary particle size of the vinylidene fluoride copolymer (freeze-dried product) was 66 μm.

Comparative Example 1

A latex (resin composition) was obtained by polymerization in the same manner as in Example 1 except that before the start of polymerization, the amount of VDF added all at once in an autoclave was changed from 13 parts by mass to 20 parts by mass, and the amount of HFP was changed from 22 parts by mass to 15 parts by mass. The solid content concentration of the obtained latex (concentration of vinylidene fluoride copolymer) was 24.0 mass %. The average primary particle size of the vinylidene fluoride copolymer contained in the latex was 190 nm, and the secondary particle size of the vinylidene fluoride copolymer (freeze-dried product) was 78 μm.

Comparative Example 2

A latex (resin composition) was obtained by polymerization in the same manner as in Example 1 except that before the start of polymerization, the amount of VDF added all at once in an autoclave was changed from 13 parts by mass to 10 parts by mass, and the amount of HFP was changed from 22 parts by mass to 35 parts by mass, and after the start of polymerization, the amount of VDF added was changed from 65 parts by mass to 55 parts by mass. The solid content concentration of the obtained latex (concentration of vinylidene fluoride copolymer) was 23.4 mass %. The average primary particle size of the vinylidene fluoride copolymer contained in the latex was 190 nm, and the secondary particle size of the vinylidene fluoride copolymer (freeze-dried product) was 294 μm.

Comparative Example 3

A latex (resin composition) was obtained by polymerization in the same manner as in Comparative Example 2 except that before the start of polymerization, the amount of VDF added all at once in an autoclave was changed from 10 parts by mass to 5 parts by mass, and the amount of HFP was changed from 35 parts by mass to 40 parts by mass. The solid content concentration of the obtained latex (concentration of vinylidene fluoride copolymer) was 19.2 mass %. The average primary particle size of the vinylidene fluoride copolymer contained in the latex was 210 nm, and the secondary particle size of the vinylidene fluoride copolymer (freeze-dried product) was not able to be measured.

Comparative Example 4

A latex (resin composition) was obtained by polymerization in the same manner as in Example 1 except that before the start of polymerization, the amount of VDF added all at once in an autoclave was changed from 13 parts by mass to 22 parts by mass, and the amount of HFP was changed from 22 parts by mass to 8 parts by mass, and after the start of polymerization, the amount of VDF added was changed from 65 parts by mass to 54 parts by mass, and the amount of HFP was changed from 0 parts by mass to 16 parts by mass. The solid content concentration of the obtained latex (concentration of vinylidene fluoride copolymer) was 20.9 mass %. The average primary particle size of the vinylidene fluoride copolymer contained in the latex was 190 nm, and the secondary particle size of the vinylidene fluoride copolymer (freeze-dried product) was 72 μm.

Comparative Example 5

A latex (resin composition) was obtained by polymerization in the same manner as in Comparative Example 4 except that before the start of polymerization, the amount of VDF added all at once in an autoclave was changed from 22 parts by mass to 20 parts by mass, and the amount of HFP was changed from 8 parts by mass to 10 parts by mass, and after the start of polymerization, the amount of VDF added was changed from 54 parts by mass to 50 parts by mass, and the amount of HFP was changed from 16 parts by mass to 20 parts by mass. The solid content concentration of the obtained latex (concentration of vinylidene fluoride copolymer) was 24.1 mass %. The average primary particle size of the vinylidene fluoride copolymer contained in the latex was 200 nm, and the secondary particle size of the vinylidene fluoride copolymer (freeze-dried product) was 96 μm.

Comparative Example 6

A latex (resin composition) was obtained in the same manner as in Example 1 except that the in-can pressure at the start of the polymerization was changed from 2.5 MPa to 3.7 MPa, and 65 parts by mass of VDF were continuously added so that the in-can pressure was maintained at 2.5 MPa when the pressure during the polymerization was reduced to 2.5 MPa. The solid content concentration of the obtained latex (concentration of vinylidene fluoride copolymer) was 24.0 mass %, an average primary particle size of the vinylidene fluoride copolymer contained in the latex was 170 nm, and the secondary particle size of the vinylidene fluoride copolymer (freeze-dried product) was 31 μm.

Comparative Example 7

A latex (resin composition) was obtained by polymerization in the same manner as in Comparative Example 6 except that before the start of polymerization, the amount of VDF added all at once in an autoclave was changed from 13 parts by mass to 8 parts by mass, and the amount of HFP was changed from 22 parts by mass to 27 parts by mass. The solid content concentration of the obtained latex (concentration of vinylidene fluoride copolymer) was 23.8 mass %. The average primary particle size of the vinylidene fluoride copolymer contained in the latex was 180 nm, and the secondary particle size of the vinylidene fluoride copolymer (freeze-dried product) was 81 μm.

Evaluation

The physical properties of the vinylidene fluoride copolymers obtained in the Examples and Comparative Examples were measured by the following methods. Table 1 indicates each numerical value.

Solid Content Concentration

Regarding the concentration (solid content concentration) of the vinylidene fluoride copolymer in the latex described above, approximately 5 g of the obtained latex was put in an aluminum cup and dried at 80° C. for 3 hours. The solid content concentration was then calculated by measuring the weight before and after drying.

Average Particle Size

The average primary particle size of the vinylidene fluoride copolymer was calculated by performing normalization analysis on the latex after polymerization by a dynamic light scattering method. Specifically, it was measured in accordance with JIS Z 8828 using DelsaMaxCORE available from BECKMAN COULTER. In addition, among the two large and small peaks obtained through normalization analysis, the large peak was set as an average primary particle size.

Furthermore, the average secondary particle size of the vinylidene fluoride copolymer was obtained by measuring, by a laser diffraction/scattering method, the vinylidene fluoride copolymer pulverized by freeze-drying or spray-drying, and the cumulative average diameter (d50) of the particle size distribution was calculated. Specifically, approximately 0.5 mg of the vinylidene fluoride copolymer described above was dispersed in water by stirring, using a Microtrac MT3300EXII, available from MicrotracBEL Corp, and used as a sample for measurement. A measurement medium was set as water, a medium refractive index was set to 1.333, a particle shape was set as a true spherical shape, a particle refractive index was set to 1.42, a measurement time was set to 30 seconds, and an average value of d50 when measured five times in a transmission mode was set as an average secondary particle size.

$$W_a \times (D_C/D_A)$$

A mass fraction $W_a$ (here, the amount of HFP constituent units) of a constituent unit derived from a fluorine-containing alkyl vinyl compound in a vinylidene fluoride copolymer was measured by $^{19}$F-NMR (available from BURUKAR). Specifically, 40 mg of vinylidene fluoride copolymer pulverized by salting was dissolved in 750 μL of acetone-d6 to prepare a sample for measurement. Among the chemical shifts obtained by $^{19}$F-NMR measurement, the peak of the $CF_3$ portion derived from the HFP constituent unit corresponds to two peaks in the vicinity of from −70 to −80 ppm, and the peak of $CF_2$ portion derived from the VDF constituent unit and the HFP constituent unit (all constituent units) corresponds to a peak of −90 ppm or less. Therefore, HFP constituent unit amount $W_a$ was obtained from these peak area ratios.

HFP constituent unit amount $W_a$ (mass %)=$CF_3$ peak area/$CF_2$ peak area×100

Subsequently, the degree of crystallinity $D_C$ of the vinylidene fluoride copolymer was calculated using the following equation.

$$\text{Degree of crystallinity } D_C[\%] = \frac{\text{True melting enthalpy of vinylidene fluoride copolymer [J/g]}}{\text{Melting enthalpy of full crystal of polyvinylidene fluoride [J/g]}} \times 100 \quad \text{(Equation 2)}$$

The melting enthalpy of the full crystal of the polyvinylidene fluoride in the above equation was set to 104.5 J/g as described in M Neidhofer: Polymer volume 45, Issue 5, 2004, 1679-1688.

On the other hand, as for the true melting enthalpy of the vinylidene fluoride copolymer, the vinylidene fluoride copolymer was calculated by measuring the melting enthalpy of reversing heat flow with a temperature modulation differential scanning calorimeter (Q-100, available from TA Instruments). More specifically, 10 mg of the freeze-dried product or the spray-dried product of the vinylidene fluoride copolymer obtained by polymerization was packed in an aluminum pan and used as a sample for measurement. The measurement conditions were an average heating rate of 5° C./min, a modulation cycle of 40 seconds, and a modulation amplitude of ±0.531° C. so that the heat-only condition was obtained.

Furthermore, the degree of amorphicity $D_A$ of the vinylidene fluoride copolymer was calculated by the following equation.

$$\text{Degree of amorphicity } D_A[\%] = 100[\%] - \text{degree of crystallinity } D_C[\%]$$

From the HFP constituent unit amount $W_a$, and the degree of crystallinity $D_C$ and the degree of amorphicity $D_A$ of the vinylidene fluoride copolymer, the value of $W_a \times (D_C/D_A)$ was calculated.

Melting Point

The melting point of the vinylidene fluoride copolymer particle was measured in the form of a film produced by the following method.

First, a mold having a depth 5 cm×width 5 cm×thickness 150 μm; and approximately 1 g of vinylidene fluoride copolymer taken out (pulverized) from the latex after polymerization by salting were sandwiched between two aluminum foils sprayed with a release agent and pressed at 200° C. The melting point was measured by using a differential scanning calorimeter ("DSC-1" available from METTLER) in accordance with ASTM D 3418.

Turbidity

The solubility of the vinylidene fluoride copolymer particle in N-methylpyrrolidone was evaluated by turbidity. The turbidity was measured in a state of a sample prepared in the following method. First, 1 g of vinylidene fluoride copolymer particle pulverized by salting or freeze-drying was added to 19 g of N-methylpyrrolidone (available from NIPPON REFINE Co., Ltd.) and stirred on a hot stirrer at 40° C. to prepare a sample. The turbidity of the sample was measured by NDH2000 (in accordance with JIS K 7136) available from Nippon Denshoku Industries Co., Ltd. Note that the sample was put in a quartz cell. The turbidity of the N-methylpyrrolidone was also set to 0, and the turbidity of the sample was calculated. When the turbidity was set 30 or less, the solubility in N-methylpyrrolidone was determined to be high.

Swelling Rate

A press film was produced in the same manner as the sample used for measuring the melting point, and the press film was cut into a piece of 2 cm×4 cm. Then, it was completely immersed in an electrolytic solution (LIPASTE (trade name)-3E7MEC/PF12(V1)) available from Toyama Chemical Co., Ltd. Then, the sample was stored for 6 hours in a gear oven at 40° C., and the swelling rate was calculated from the change in weight of the sample pieces.

$$\text{Swelling rate } [\%] = \frac{\text{Weight after swelling [g]} - \text{Sample piece weight [g]}}{\text{Sample piece weight [g]}} \quad \text{[Equation 3]}$$

TABLE 1

| | HFP constituent unit amount $W_a$ (mass %) | $W_a \times (D_C/D_A)$ | Melting point (° C.) | Turbidity | Swelling Rate (mass %) |
|---|---|---|---|---|---|
| Example 1 | 18.9 | 11.1 | 116 | 10.8 | 184 |
| Example 2 | 25.8 | 9.7 | 113 | 3.7 | 279 |
| Example 3 | 29.1 | 7.2 | 112 | 18.4 | 241 |
| Example 4 | 25.8 | 5.3 | 117 | 3.0 | 221 |
| Example 5 | 13.9 | 13.9 | 125 | 13.1 | 95 |
| Comparative Example 1 | 12.3 | 15.1 | 129 | 49.6 | 84 |
| Comparative Example 2 | 32.0 | 3.8 | 80 | 44.0 | 440 |
| Comparative Example 3 | 39.5 | 2.6 | 76 | 68.6 | Elution |
| Comparative Example 4 | 20.2 | 9.8 | 100 | 0.3 | Elution |
| Comparative Example 5 | 25.9 | 4.2 | 94 | 0.9 | Elution |
| Comparative Example 6 | 20.8 | 13.7 | 140 | 31.7 | 89 |
| Comparative Example 7 | 25.5 | 11.2 | 134 | 30.8 | 106 |

As indicated in Table 1 above, in Examples 1 to 5, in which the melting point is in the range of from 105° C. to 125° C. and in which a mass fraction $W_a$ of a constituent unit derived from a fluorine-containing alkyl vinyl compound (HFP) in a vinylidene fluoride copolymer, a degree of crystallinity $D_C$ of the vinylidene fluoride copolymer, and a degree of amorphicity $D_A$ of the vinylidene fluoride copolymer satisfy $4.7 \leq W_a \times (D_C/D_A) \leq 14$, the solubility with respect to N-methylpyrrolidone was high, and the solubility (swelling rate) in the electrolytic solution was low (Examples 1 to 5).

In contrast, in Comparative Example 1 in which $W_a \times (D_C/D_A)$ was more than 14 and the melting point of the vinylidene fluoride copolymer was higher than 125° C., the solubility in N-methylpyrrolidone was low, and the turbidity was high. In addition, even if $W_a \times (D_C/D_A)$ was 14 or less, when the melting point higher than 125° C. (Comparative Examples 6 and 7), the solubility in N-methylpyrrolidone was low and the turbidity was high.

On the other hand, in a case where the amount of $W_a \times (D_C/D_A)$ was less than 4.7 and the melting point was less than 105° C. (Comparative Example 2, Comparative Example 3, and Comparative Example 5), the vinylidene fluoride copolymer was easily eluted into the electrolytic solution or swollen by the electrolytic solution. Furthermore, even if the amount of $W_a \times (D_C/D_A)$ was in an appropriate range (4.7 or greater and 14 or less) (Comparative Example 4), the vinylidene fluoride copolymer was easily eluted in the electrolytic solution when the melting point was excessively low.

This application claims the priority to JP 2018-104687, filed on May 31, 2018. The contents described in the specification of said application are all incorporated herein by reference.

INDUSTRIAL APPLICABILITY

According to the present invention, it is possible to provide a resin composition for a non-aqueous electrolyte secondary battery, the resin composition including a vinylidene fluoride copolymer which has: a high adhesive strength with respect to a material constituting a non-aqueous electrolyte secondary battery, such as a current collector, a separator, an active material, and the like, small swelling caused by an electrolytic solution, and high solubility with respect to N-methylpyrrolidone.

The invention claimed is:

1. A resin composition for a non-aqueous electrolyte secondary battery comprising:
   a vinylidene fluoride copolymer having a constituent unit derived from vinylidene fluoride and a constituent unit derived from a fluorine-containing alkyl vinyl compound, wherein
   a melting point, measured in accordance with ASTM D3418, of the vinylidene fluoride copolymer is from 105° C. to 125° C.,
   a mass fraction $W_a$ of the constituent unit derived from the fluorine-containing alkyl vinyl compound in the vinylidene fluoride copolymer is 18 mass % or greater and 30 mass % or less, and
   the mass fraction $W_a$ of the constituent unit derived from the fluorine-containing alkyl vinyl compound in the vinylidene fluoride copolymer, a degree of crystallinity $D_C$ of the vinylidene fluoride copolymer, and a degree of amorphicity $D_A$ of the vinylidene fluoride copolymer satisfy Equation (1):

$$4.7 \leq W_a \times (D_C/D_A) \leq 14 \qquad (1).$$

2. The resin composition for a non-aqueous electrolyte secondary battery according to claim 1,
   wherein the fluorine-containing alkyl vinyl compound is hexafluoropropylene.

3. The resin composition for a non-aqueous electrolyte secondary battery according to claim 1, further comprising:
   a dispersion medium,
   wherein the vinylidene fluoride copolymer having a primary particle size of from 10 to 700 nm is dispersed in the dispersion medium.

4. The resin composition for a non-aqueous electrolyte secondary battery according to claim 1,
   wherein the resin composition is a powder having an average secondary particle size of from 30 μm to 200 μm.

5. A separator for a non-aqueous electrolyte secondary battery comprising:
   a separator film; and
   a resin layer disposed on at least one surface of the separator film,
   wherein the resin layer contains at least a solid content of the resin composition for a non-aqueous electrolyte secondary battery described in claim 1.

6. A resin composition for an electrode mixture layer comprising:
   the resin composition for a non-aqueous electrolyte secondary battery described in claim 1; and
   an electrode active material.

7. An electrode for a non-aqueous electrolyte secondary battery comprising:
   a current collector; and
   an electrode mixture layer disposed on the current collector,
   wherein the electrode mixture layer contains a solid content of the resin composition for an electrode mixture layer described in claim 6.

8. A non-aqueous electrolyte secondary battery comprising:
   a pair of electrodes; and
   a separator disposed the electrodes,
   wherein the separator is the separator for a non-aqueous electrolyte secondary battery described in claim 5.

9. A non-aqueous electrolyte secondary battery comprising
   at least a pair of electrodes,
   wherein at least one of the pair of electrodes is the electrode for a non-aqueous electrolyte secondary battery described in claim 7.

* * * * *